(12) United States Patent
Bennett et al.

(10) Patent No.: US 6,254,954 B1
(45) Date of Patent: Jul. 3, 2001

(54) PRESSURE-SENSITIVE ADHESIVE TAPE

(75) Inventors: Greggory S. Bennett, Hudson, WI (US); Clayton A. George, Afton, MN (US); Guido Hitschmann, Neuss (DE); Alain H. Lamon, Le Pecq (FR)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/367,958

(22) PCT Filed: Feb. 28, 1997

(86) PCT No.: PCT/US97/03170

§ 371 Date: Aug. 26, 1999

§ 102(e) Date: Aug. 26, 1999

(87) PCT Pub. No.: WO98/38262

PCT Pub. Date: Sep. 3, 1998

(51) Int. Cl.[7] ............ B32B 27/04; B32B 27/16; B32B 27/38

(52) U.S. Cl. .......... 428/41.8; 428/345; 428/355 EP; 522/31; 522/66; 522/109; 522/111; 522/170; 156/275.7; 156/330

(58) Field of Search .................... 428/41.8, 345, 428/355 EP, 413, 414; 522/31, 66, 109, 111, 170; 525/438; 156/272.3, 275.7, 330

(56) References Cited

U.S. PATENT DOCUMENTS

| | | |
|---|---|---|
| 3,708,296 | 1/1973 | Schlesinger . |
| 3,729,313 | 4/1973 | Smith . |
| 3,741,769 | 6/1973 | Smith . |
| 3,794,576 | 2/1974 | Watt . |
| 3,808,006 | 4/1974 | Smith . |
| 4,026,705 | 5/1977 | Crivello et al. . |
| 4,058,401 | 11/1977 | Crivello . |
| 4,069,054 | 1/1978 | Smith . |
| 4,069,055 | 1/1978 | Crivello . |
| 4,101,513 | 7/1978 | Fox et al. . |
| 4,216,288 | 8/1980 | Crivello . |
| 4,231,951 | 11/1980 | Smith et al. . |
| 4,250,203 | 2/1981 | Schlesinger et al. . |
| 4,256,828 | 3/1981 | Smith . |
| 4,394,403 | 7/1983 | Smith . |
| 4,623,676 | 11/1986 | Kistner . |
| 4,920,182 | 4/1990 | Manser et al. . |
| 5,059,701 | 10/1991 | Keipert . |
| 5,077,870 | 1/1992 | Melbye et al. . |
| 5,089,536 | 2/1992 | Palazzotto . |
| 5,436,063 | 7/1995 | Follett et al. . |
| 5,475,956 | 12/1995 | Agrawal et al. . |

FOREIGN PATENT DOCUMENTS

| | | |
|---|---|---|
| 0 109 851 B1 | 9/1993 | (EP) . |
| 0 620 259 A2 | 10/1994 | (EP) . |
| 0 620 259 A3 | 10/1994 | (EP) . |
| 9400679 | 12/1995 | (NL) . |
| WO 98/38262 | 9/1998 | (WO) . |

*Primary Examiner*—Michael W. Ball
*Assistant Examiner*—Michael A. Tolin
(74) *Attorney, Agent, or Firm*—Harold C. Knecht, III

(57) ABSTRACT

The invention relates to a pressure-sensitive adhesive tape with improved room temperature handleability comprising an adhesive layer with at least one exposed surface and optionally a backing, wherein the pressure-sensitive adhesive layer comprises an epoxy/polyester based pressure sensitive adhesive which is crosslinkable upon exposure to actinic or e-beam irradiation and optionally heat, and comprises (i) 30–80% by weight of a polyester component comprising one or more amorphous polyesters compounds,
(ii) 20–70% by weight of an epoxy component comprising one or more epoxy resins and/or monomers,
(iii) 0–50% by weight of a hydroxyl-functional component containing one or more hydroxyl-containing compounds having a hydroxyl functionality of at least 1, and
(iv) an effective amount of a photoinitiator component for crosslinking the pressure-sensitive adhesive, whereby the weight percentages refer to the total mass of components (i)–(iv) and add up to 100 wt. %, and which exhibits a holding power of at least 5 min.

8 Claims, No Drawings

PRESSURE-SENSITIVE ADHESIVE TAPE

BACKGROUND OF THE INVENTION

1. Field of the Invention

The present invention relates to a pressure-sensitive adhesive tape with improved room temperature handleability comprising at least one adhesive layer with at least one exposed surface and optionally a backing, wherein the pressure-sensitive adhesive layer comprises an epoxy/polyester based pressure-sensitive adhesive which is crosslinkable upon exposure to actinic or e-beam irradiation. The invention furthermore refers to a method of bonding a first substrate to a second substrate by using such pressure-sensitive adhesive tape and to the assembly prepared by such method.

2. Description of the Related Art

U.S. Pat. No. 4,920,182 describes UV-activatable curable compositions comprising one or more epoxy resins having an average of at least two 1,2-epoxy groups per molecule, one or more flexible polyesters which are terminated by, on average, at least two carboxyl groups, and a metallocene complex initiator. The composition, which can be used for the production of surface coatings on a variety of substrates or as an adhesive, can be cured by the application of heat or with a combination of irradiation and heat. The curing temperature is generally 40–200° C., preferably 80–110° C.

U.S. Pat. No. 4,256,828 describes photocopolymerizable compositions which contain epoxides, organic material with hydroxyl functionality such as hydroxyl-terminated polyesters, and a photosensitive aromatic sulfonium or iodonium salt of a halogen-containing complex ion. The compositions can be used in a variety of applications, for example, as photocurable ink vehicles, binders for abrasive particles, paints, adhesives, coatings for lithographic and relief printing plates, protective coatings for metals, wood, etc. The compositions are typically coated onto the respective surface, and are photocurable at room temperature or below.

The curable hot melt compositions of European Patent Publication No. 0,620,259 comprise an epoxy component, a polyester component, a photoinitiator and optionally a hydroxyl-containing material. The hot melt compositions, which can be tacky or non-tacky, may be applied to a variety of substrates by extruding, spraying, gravure printing or coating (e.g. by using a coating die, a heated knife blade coater, a roll coater or a reverse roll coater). The hot melt composition may also be applied as an uncured, free-standing adhesive film which, when used to bond a first substrate, may be irradiated on one or both sides and then placed between two substrates by the use of heat, pressure or both heat and pressure to bond the film to the two substrates. Alternatively, it is possible to laminate the hot melt adhesive film to a backing at room temperature using a pressure of, for example, 10 psi as is suggested in U.S. Pat. No. 5,436,063. This reference describes a coated abrasive article comprising a backing, a first binder on the backing, a plurality of abrasive particles in the first binder, and a second binder over the first binder and the abrasive particles. The first binder is a photocurable hot-melt adhesive as described in European Patent Publication No. 0,620,259.

While the crosslinkable hot melt epoxy/polyester based adhesives described above have broad utility, there are certain, specific applications where improved mechanical integrity and/or cohesive strength are desired or required. Therefore there is a need for a crosslinkable epoxy/polyester based pressure-sensitive adhesive materials available to the person skilled in the art to allow him or her to select appropriate adhesive materials exhibiting advantageous properties for a specific application and, in particular, for the preparation of unsupported and supported pressure-sensitive adhesive tapes with improved and/or convenient handleability at room temperature or below. Other objects of the present invention can be taken from the detailed specification below.

BRIEF DESCRIPTION OF THE INVENTION

The present invention refers to a pressure-sensitive adhesive tape with improved room temperature handleabilty comprising at least one pressure-sensitive adhesive layer with at least one exposed surface and optionally a backing, wherein the pressure-sensitive adhesive layer comprises an epoxy/polyester based pressure sensitive adhesive which is crosslinkable upon exposure to actinic or e-beam irradiation and which comprises:

(i) 30–80% by weight of a polyester component comprising one or more amorphous polyester compounds;
(ii) 20–70% by weight of an epoxy component comprising one or more epoxy resins and/or monomers;
(iii) 0–50% by weight of a hydroxyl-functional component containing one or more hydroxyl-containing compounds having a hydroxyl functionality of at least 1; and
(iv) an effective amount of a photoinitiator component for crosslinking the pressure-sensitive adhesive;

wherein the weight percentages refer to the total mass of components (i)–(iv) and add up to 100% by weight, and further wherein the pressure-sensitive adhesive which exhibits a holding power of at least 5 minutes.

The present invention furthermore refers to a method of bonding a first substrate to a second substrate with a pressure-sensitive adhesive tape according to the invention having two exposed adhesive surfaces. The method comprises the steps of applying the first exposed surface of the pressure-sensitive adhesive to the first substrate and attaching the second substrate to the second exposed surface of the pressure-sensitive adhesive whereby the pressure-sensitive adhesive layer according to the invention is subjected to actinic or e-beam irradiation and, optionally, heat prior to bonding them to the respective substrate within the aftercure bonding time or after bonding them to the respective substrates. The invention furthermore refers to assemblies which are obtainable by such method.

DETAILED DESCRIPTION OF THE PREFERRED EMBODIMENT

The term pressure-sensitive adhesive tape as referred to above and below describes supported or unsupported, essentially two-dimensional articles such as sheets, strips, ribbons or die-cut parts (i.e., the extension of the articles in two directions distinctly exceeds the extension in the third direction):

(i) which are tacky at room temperature and can be applied to a wide variety of substrates by exerting, for example, finger pressure, and
(ii) which can be conveniently handled at lower temperatures such as room temperature without breaking, i.e., which exhibit a sufficiently high internal strength and cohesivity and a certain elasticity so that removable liners can easily be stripped off the tape without damaging the tape, and the tape can at least be slightly stretched and transferred to the substrate by hand.

Feature (i) requires an initial 90° peel adhesion value on stainless steel as measured 20 minutes after application onto the substrate according to the test method specified below of at least 4N/inch or more.

Feature (ii) requires a holding power time as measured according to the test method specified in the experimental part below, of at least 5 minutes or more.

The epoxy/polyester based pressure-sensitive adhesive tapes according to the present invention are crosslinkable and can be converted to crosslinked pressure-sensitive adhesive tapes upon exposure to actinic or e-beam irradiation and, optionally, heat. The crosslinked pressure-sensitive adhesive may bond, for example, 2 substrates, and the resulting configuration is termed as an assembly.

The term adhesive film as referred to above and below describes two-dimensional articles which may be tacky or non-tacky at room temperature and exhibit a debonding time of less than 5 min. and, in particular, of not more than 3 minutes.

The pressure-sensitive adhesive tapes of the present invention which may be supported or unsupported, exhibit at least one pressure-sensitive adhesive layer comprising an epoxy/polyester based pressure-sensitive adhesive.

It was found by the present inventors that for imparting improved room temperature handleability to the pressure-sensitive adhesive tapes it is essential that the polyester component (i) of the pressure-sensitive adhesive comprises one or more amorphous polyester compounds. Amorphous polyesters are differentiated from crystalline polyesters in that they do not display a measurable crystalline melting point when subjecting a sample of about 8 mg to a DSC (differential scanning calorimetry) scan at a rate of 20° C./min. from −60° C. to 200° C. The DSC measurements are preferably performed by using commercially available DSC equipment such as, for example, a DSC7 differential scanning calorimeter from Perkin Elmer, Norwalk, Conn., U.S.A.

While not displaying a crystalline melting point when being subject to the DSC scan described above, the amorphous polyester compounds exhibit a glass transition temperature which preferably is between −20° C. and 50° C. Especially preferred are amorphous polyester compounds with a glass transition temperature of between −15° C. and 25° C. and, most preferred, of between 0 and 25° C.

Amorphous polyester compounds which can be used for the preparation of the tapes according to the present invention include both hydroxyl- and carboxyl-terminated materials. The softening point preferably is between 50 and 150° C., more preferably between 70 and 140° C., and most preferably between 60 and 110° C. The molecular weight is preferably adjusted to give a melt flow rate at 200° C. of between 10 and 300 g/min and more preferably between 20 and 250 g/min. The melt flow rate is measured according to DIN ISO 1133 by placing approximately 10 g of the respective amorphous polyester compound in a temperature-conditioned metal cylinder. Via a cylindrical die, a force of 21.6 N acts on the melted sample. The amount of sample which flows through a standardized nozzle within a certain time is weighed and is converted to a flow rate given in g/min. Preferred amorphous compounds also have a number average equivalent weight of about 7,500 to 200,000 and more preferably from about 10,000 to about 50,000 as determined by GPC (gel permeation chromatography) in THF (tetrahydrofuran) calibrated with polystyrene standards.

Polyester compounds which are useful for the preparation of the tapes according to the present invention can be obtained, for example, as the reaction product of dicarboxylic acids (or their diester equivalents) and diols. Examples of aliphatic dicarboxylic acids are saturated aliphatic dicarboxylic acids, such as oxalic acid, malonic acid, succinic acid, α-methylsuccinic acid, glutaric acid, adipic acid, pimelic acid, azelaic acid, sebacic acid or dimerized linoleic acid; or unsaturated aliphatic polycarboxylic acids, such as maleic acid, fimaric acid, mesaconic acid, citraconic acid, glutaconic acid or itaconic acid, and also possible anhydrides of these acids. Examples of cycloaliphatic dicarboxylic acids are hexahydrophthalic, hexahydroisophthalic or hexahydroterephthalic acid, tetrahydrophthalic, tetrahydroisophthalic of tetrahydroterephthalic acid or 4-methyltetrahydrophthalic acid, 4-methylhexahydrophthalic acid or endomethylenetetrahydrophthalic acid. Examples of aromatic dicarboxylic acids are phthalic, isophthalic and terephthalic acid. Examples of polyfunctional carboxylic acids are aromatic tricarboxylic or tetracarboxylic acids, such as trimellitic acid, trimesic acid, pyromellitic acid or benzophenonetetracarboxylic acid; or trimerized fatty acids or mixtures of dimerized and trimerized fatty acids, such as are available commercially, for example, under the trade name Pripol®. Blends of any of the foregoing diacids or polyacids may also be used.

Examples of suitable aliphatic diols are α,ω-alkylenediols, such as ethylene glycol, propane-1,2-diol, propane-1,3-diol, butane-1,4-diol, pentane-1,5-diol, neopentyl glycol, hexane-1,6-diol, octane-1,8-diol, decane-1,10-diol or dodecane-1,12-diol. Examples of suitable cycloaliphatic diols are 1,3-dihydroxycyclohexane, 1,4-dihydroxycyclohexane, 1,4-cyclohexanedimethanol, bis-4-(hydroxycyclohexyl)-methane or 2,2-bis-(4-hydroxycyclohexyl)-propane. Examples of suitable polyfunctional alcohols are 1,1,1-trimethylolethane, 1,1,1-trimethylolpropane, glycerol or pentaerythritol. Long chain diols including poly (oxyalkylene) glycols in which the alkylene group preferably contains from 2 to 9 carbon atoms (more preferably from 2 to 4 carbon atoms) may also be used. Blends of any of the foregoing diols or polyols may also be used.

The examples of di- or polycarboxylic acids, esters or anhydrides, and di- or polyhydroxylic compounds are merely to illustrate the invention without limiting it.

Reacting, for example, the dicarboxylic acids (or their diester equivalents) and the diols enumerated above may result in amorphous and/or semicrystalline polyesters. Amorphous polyester compounds can be easily identified by subjecting them to a DSC scan as was described above. Amorphous rather than crystalline polyester compounds can be obtained, for example, by reacting adducts with a high degree of stereo-irregularity which cannot effectively pack into crystalline structures and impart a high degree of entropy to the resulting polymer. Details on the preparation of amorphous polymers can be found, for example, in Encyclopedia of Polymer Science and Engineering, New York 1988, vol. 12, pp. 1–312 and the references cited therein, and in the Polymeric Materials Encyclopedia, Boca Raton 1996, vol. 8, pp. 5887–5909 and the references cited therein.

Amorphous polyester compounds are also commercially available, for example, from Hüls AG, Marl, Germany, as Dynapol S 1606, S 1611, S 1426, S 1427, S 1313, S 1421, and S 1420 with Dynapol S 1313, S 1421 and S 1420 being preferred.

The polyester component (i) of the pressure-sensitive adhesive of the present invention can also comprise a small amount of crystalline polyester compounds.

The pressure-sensitive adhesive used for the preparation of the pressure-sensitive adhesive tapes according to the invention further comprises an epoxy component (ii) containing one or more organic compounds having an oxirane ring polymerizable by ring opening. Such compounds, broadly called epoxides, include monomeric epoxy compounds and epoxides of the polymeric type and can be aliphatic, cycloaliphatic, aromatic or heterocyclic. Monomeric and oligomeric epoxy compounds preferably have at least two and more, preferably two to four, polymerizable epoxy groups per molecule. In polymeric type epoxides or epoxy resins, there may be many pendent epoxy groups (e.g., a glycidyl methacrylate polymer could have several thousand pendent epoxy groups per average molecular weight). Oligomeric epoxides and, in particular, polymeric epoxy resins are preferred.

The molecular weight of the epoxy-containing materials (ii) may vary from low molecular weight monomeric or oligomeric materials with a molecular weight, e.g., from about 100 to polymeric resins with a molecular weight of about 50,000 or more and may vary greatly in the nature of their backbone and substituent groups. For example, the backbone may be of any type, and substituent groups thereon can be any group not having a nucleophilic group or electrophilic group (such as an active hydrogen atom) which is reactive with an oxirane ring or which substantially inhibits cationic polymerization. Illustrative of permissible substituent groups are halogens, ester groups, ethers, sulfonate groups, siloxane groups, nitro groups, amide groups, nitrile groups, phosphate groups, etc. Mixtures of various epoxy-containing compounds can also be used in the epoxy part (ii) of the precursor of this invention. The epoxy component (ii) preferably comprises a mixture of two or more epoxy resins in order to modify and adapt the mechanical properties of the cured adhesive with respect to specific requirements.

The term "epoxy resin" is used herein to mean any of dimeric, oligomeric or polymeric epoxy materials containing a plurality, i.e. at least 2, of epoxy functional groups. Types of epoxy resins that can be used include, for example, the reaction product of bisphenol A and epichlorohydrin, the reaction product of phenol and formaldehyde (novolac resin) and epichlorohydrin, peracid epoxies, glycidyl esters, the reaction product of epichlorohydrin and p-amino phenol, the reaction product of epichlorohydrin and glyoxal tetraphenol and the like.

Suitable commercially available diglycidic ethers of bisphenol-A are Ciba Geigy Araldite™ 6010, Dow Chemical DER™ 331, and Shell Chemical Epon™ 825, 828, 826, 830, 834, 836, 1001, 1004, 1007, etc. A polyepoxidized phenol formaldehyde novolac prepolymer is available from Dow Chemical as DEN™ 431 and 438 and from Ciba Geigy as CY-281™, and a polyepoxidized cresol formaldehyde novolac prepolymer is available from Ciba Geigy as ECN™ 1285, 1280 and 1299. A polyglycidyl ether of polyhydric alcohol is available from Ciba Geigy, based on butane-1,4-diol, as Araldite™ RD-2; and from Shell Chemical Corporation based on glycerine, as Epon™ 812. Suitable commercially available flexible epoxy resins include polyglycol diepoxies, DER™ 732 and 736, from Dow Chemical Company, diglycidyl ester of linoleic dimer acid, Epon™ 871 and 872 from Shell Chemical Company, diglycidyl ester of a bisphenol in which the aromatic rings are linked by a long aliphatic chain, Lekutherm™ X-80, from Mobay Chemical Company, epoxidized synthetic rubber materials which are available from Shell Chemical Corporation and epoxidized natural rubber materials such as ENR-10, ENR-25 and ENR-50 which are available from the Rubber Research Institute of Malaysia. The ENR materials are described in Encyclopedia of Polymer Science and Engineering, New York 1988, vol. 14, p. 769.

High functional epoxy resins (i.e. functionality greater than 2) which can be used include, for example, a solid epoxy novolac resin, DEN™ 485 from Dow Chemical Company, a tetrafunctional solid epoxy resin, Epon™ 1031 from Shell Chemical Company, and N,N,N',N'-tetraglycidyl-4,4'-methylenebisbenzenamine, Araldite™ 720 from Ciba Corporation. Difunctional epoxy resins which can be used include, for example, a solid resin, N,N,N',N',-tetraglycidyl-a,A'-bis(4-aminophenyl)-p-diisopropylbenzene, HPT™ 1071 from Shell Company, solid diglycidyl ether of bisphenol-9fluorene, HPT™ 1079 from Shell Chemical Company, and triglycidylether of paraaminophenol, Araldite™ 0500/0510 from Ciba-Geigy Corporation.

Useful cycloaliphatic epoxy resins include, for example, vinylcyclohexane dioxide which is commercially available as ERL-4206 from Union Carbide Corp., 3,4-epoxycyclohexylmethyl-3,4-epoxycyclohexane carboxylate commercially available as ERL-4221 from Union Carbide Corp., 3,4-epoxy-6-methylcyclohexylmethyl-3,4-epoxy-6-methylcyclo hexane carboxylate commercially available as ERL-4201 from Union Carbide Corp., bis(3,4-epoxy-6-methylcyclohexylmethyl)adipate commercially available as ERL-4289 from Union Carbide Corp. or bis(2,3-epoxycyclopentyl)ether commercially available as ERL-0400 from Union Carbide Corp.

The pressure-sensitive adhesive used for the preparation of the pressure-sensitive adhesive tapes according to the present invention furthermore comprises as component (iv) a photoinitiator component comprising an effective amount of one or more photoinitiator compounds. The photopolymerization may be performed at room temperature or below but may also be performed at higher temperatures which preferably are lower than the melting temperature of the pressure-sensitive adhesive tape, in order to accelerate the crosslinking reaction.

The photopolymerization is preferably performed as cationic polymerization, and the photoinitiators are preferably selected from a group consisting of metallocene salts and aromatic onium salts. Suitable salts of organometallic complex cations (or metallocene salts) include but are not limited to, those salts having the following formula (I)

wherein $M^p$ represents a metal ion selected from the group consisting of Cr, Mo, W, Mn Re, Fe. and Co with p denoting the charge of the metal ion;

$L^1$ represents 1 or 2 ligands contributing pi-electrons that can be the same or different ligand selected from the group of: substituted and unsubstituted $\eta^3$-allyl, $\eta^5$-cyclopentadienyl, and $\eta^7$-cycloheptatrienyl, and $\eta^6$-aromatic compounds selected from $\eta^6$-benzene and substituted $\eta^6$-benzene compounds and compounds having 2 to 4 fused rings, each capable of contributing 3 to 8 pi-electrons to the valence shell of $M^p$;

$L^2$ represents none, or 1 to 3 ligands contributing an even number of sigma-electrons that can be the same or different ligand selected from the group of: carbon monoxide, nitrosonium, triphenyl phosphine, triphenyl stibine and derivatives of phosphorus, arsenic and antimony, with the proviso that the total electronic charge contributed to $M^p$ results in a net residual positive charge of q to the complex;

q is an integer having a value of 1 or 2, the residual charge of the complex cation;

Y is halogen-containing complex anion selected from $BF_4^-$, $AsF_6^-$, $PF_6^-$, $SbF_5OH^-$, $SbF_6^-$, and $CF_3SO_3^-$; and n is an integer having a value of 1 and 2, the number of complex anions required to neutralize the charge q on the complex cation.

Preferred examples of suitable salts of organometallic complex which are cations useful in the pressure-sensitive adhesive tape of the invention include the following:

($\eta^6$-benzene)($\eta^5$-cyclopentadienyl)iron(+) hexafluoroantimonate ($\eta^6$-toluene)($\eta^5$-cyclopentadienyl)iron(1+) hexafluoroarsenate ($\Theta^6$-cumene)($\eta^5$-cyclopentadienyl)iron(1+) hexaflurorphosphate ($\eta^6$-p-xylene)($\eta^5$-cyclopentadienyl)iron (1+) hexafluoroantinomate ($\eta^6$-xylenes)(mixed isomers)($\eta^5$-cyclopentadienyl)iron (1+) hexafluorophosphate ($\eta^6$-o-xylene)($\eta^5$-cyclopentadienyl)iron(1+) triflate
($\eta^6$-m-xylene)($\eta^5$-cyclopentadienyl)iron(1+) tetrafluoroborate
($\eta^6$-mesitylene)($\eta^5$-cyclopentadienyl)iron(1+) hexafluoroantimonate
($\eta^6$-hexamethylbenzene)($\eta^5$-cyclopentadienyl-)iron(1−) pentafluorohydroxyantimonate
($\eta^6$-naphthalene)($\eta^5$-cyclopentadienyl)iron(1+) tetrafluoroborate
($\eta^6$-pyrene)($\eta^5$-cyclopentadienyl)iron(1+) triflate
($\eta^6$-toluene)($\eta^5$-cyclopentadienyl)iron(1+) hexafluoroantimonate
($\eta^6$-cumene)($\eta^5$-cyclopentadienyl)iron(1+) hexafluoroantimonate
($\eta^6$-p-xylene)($\eta^5$-cyclopentadienyl)iron(1+) hexafluoroantimonate
($\eta^6$-m-xylene)($\eta^5$-cyclopentadienyl)iron(1+) hexafluoroantimonate
($\eta^6$-hexamethylbenzene)($\eta^5$-cyclopentadienyl-)iron(1+) hexafluoroantimonate
($\eta^6$-naphthalene)($\eta^5$-cyclopentadienyl)iron(1+) hexafluoroantimonate
($\eta^6$-pyrene)($\eta^5$-cyclopentadienyl)iron(1+) hexafluoroantimonate
($\eta^6$-chrysene)($\eta^5$-cyclopentadienyl)iron(1+) hexafluoroantimonate
($\eta^6$-perylene)($\eta^5$-cyclopentadienyl)iron(1+) hexafluoroantimonate
($\eta^6$-chrysene)($\eta^5$-cyclopentadienyl)iron(1+) pentafluorohydroxyantimonate
($\eta^6$-acetophenone)($\eta^5$-methylcyclopentadienyl-)iron(1+) hexafluoroantimonate
($\eta^6$-fluorene)($\eta^5$-cyclopentadienyl)iron(1+) hexafluoroantimonate Metallocene salts of formula I and their preparation are described, for example, in U.S. Pat. No. 5,089,536, U.S. Pat. No. 5,059,701 and European Patent Publication No. 0,109, 851. The metallocene salts may be used in conjunction with a reaction accelerator such as an oxalate ester of a tertiary alcohol.

Also preferred are aromatic onium salts which are disclosed, for example in U.S. Pat. Nos. 4,069,054, 4,231, 951 and 4,250,203. Such salts can be described by the formula:

$$AX \quad \quad \quad (II)$$

wherein
A is an organic cation selected from those described in U.S. Pat. Nos. 3,708,296, 3,729,313, 3,741,769, 3,794,576, 3,808,006, 4,026,705, 4,058,401, 4,069,055, 4,101,513, 4,216,288, 4,394,403, and 4,623,676, all incorporated herein by reference, and
X is an anion where X is defined as Y in formula (I) above.
A is preferably selected from diazonium, iodonium, and sulfonium cations and more preferably from diphenyliodonium, triphenylsulfonium and phenylthiophenyl diphenylsulfonium. X preferably is selected from the group of anions consisting of $CF_3SO_3^-$, $BF_4^-$, $PF_6^-$, $SbF_6^-$, $SbF_6OH^-$, $AsF_6^-$, and $SbCl_6^-$.

Aromatic iodonium salts and aromatic sulfonium salts are preferred. Especially preferred aromatic iodonium and aromatic sulfonium salts are described in European Patent Publication No. 0,620,259, p. 5, ln. 17 to p. 6, ln. 29.

Useful commercially available cationic photoinitiators include UVOX UVI-6974, an aromatic sulfonium complex salt (Union Carbide Corp.), and IRGACURE 261, a metallocene complex salt (Ciba-Geigy).

The pressure-sensitive adhesives which are useful for the preparation of pressure-sensitive adhesive tapes according to the invention optionally comprise a hydroxyl-functional component (iii) containing one or more hydroxyl-containing compounds having a hydroxyl functionality of at least 1, and more preferably of at least 2. The hydroxyl-containing compounds should be substantially free of other "active hydrogen" containing groups such as amino and mercapto moieties. The hydroxyl-containing compounds should also be substantially free of groups which may be thermally and/or photolytically unstable so that the compounds will not decompose or liberate volatile components when exposed to e-beam or actinic radiation and, optionally, to heat during curing. Preferably the compounds contain two or more primary or secondary aliphatic hydroxyl groups (i.e., the hydroxyl group is bonded directly to a non-aromatic carbon atom). The hydroxyl group may be terminally situated, or may be pendent from a polymer or copolymer. The number average equivalent weight of the hydroxyl-containing material is preferably about 31 to 2500, more preferably about 80 to 1000, and most preferably about 80 to 350.

The hydroxyl number which can be described by the equation:

$$OH = \frac{56.1 \times 1000 \times f}{m.w.}$$

wherein
OH=hydroxyl number of the hydroxyl functional compound;
f=functionality, that is, average of hydroxyl groups per molecule of hydroxyl functional compound; and
m.w.=molecular weight of the hydroxyl functional compound (number average).

Illustrative examples of hydroxyl-containing materials include both monomeric and polymeric compounds. Monomeric hydroxyl-functional compounds comprise, for example, such as ethylene glycol, propylene glycol, 1,3-dihydroxypropane, 1,3-dihydroxybutane, 1,4-dihydroxybutane, 1,4-, 1,5-, and 1,6-dihydroxyhexane, 1,2-, 1,3-, 1,4-, 1,6-, and 1,8-dihydroxyoctane, 1,10-dihydroxyhexane, 1,1,1-trimethylolethane, 1,1,1-trimethylolpropane, pentaerythritol, polycaprolactone, xylitol, arabitol, sorbitol or mannitol. Suitable examples of polymeric hydroxyl-functional compounds comprise, for example, polyoxyalkylene polyols (e.g., polyoxyethylene and polyoxypropylene glycols and triols of equivalent weight of 31 to 2500 for the diols or 80 to 350 for triols), polytetramethylene oxide glycols of varying molecular weight, hydroxyl-terminated polyesters, and hydroxyl-terminated polyacetones.

Useful commercially available hydroxyl-containing materials include the POLYMEG series (available from QO Chemicals, Inc.) of polytetramethylene oxide glycols such as POLYMEG 650, 1000 and 2000; the TERATHANE series (from E.I. duPont de Nemours and Company) of polytetramethylene oxide glycols such as TERATHANE 650, 1000 and 2000; POLYTHF, a polytetramethylene oxide glycol from BASF Corp.; the BUTVAR series (available from Monsanto Chemical Company) of polyvinylacetal resins such as BUTVAR B-72A, B-73, B-76, B-90 and B-98; the TONE series (available from Union Carbide) of polycaprolactone polyols such as TONE 0200, 0210, 0230, 0240, and 0260; the DESMOPHEN series (available from Miles Inc.) of saturated polyester polyols such as DESMOPHEN 2000, 2500, 2501, 2001KS, 2502, 2505, 1700, 1800, and 2504; the RUCOFLEX series (available from Ruco Corp.) of saturated polyester polyols such as S-107, S-109, S-011 and S-1014; VORANOL 234–630 (a trimethylol propane) from Dow Chemical Company; VORANOL 230–238 (a glycerol polypropylene oxide adduct) from Dow Chemical Company; the SYNFAC series (from Milliken Chemical) of polyoxyalkylated bisphenol A's such as SYNFAC 8009, 773240, 8024, 8027, 8026, and 8031; the ARCOL series (from Arco Chemical Co.) of polyoxypropylene polyols such as ARCOL 425, 1025, 2025, 42, 112, 168, and 240; and the SIMULSOL series from Seppic, Paris, France) of bisphenol-A extended polyols such as SIMULSOL PHE, BPIE, BPJE, BPLE, BPNE, BPRE, BPHP, BPIP, BPRP and BPUP.

The amount of the polyester component (i) with respect to the total mass of components (i)–(iv) is between 30 wt. %–80 wt. % and preferably between 35 wt. % and 55 wt. %. The polyester component comprises one or more polyester compounds and, in particular, from 1–4 polyester compounds at least one of them being an amorphous polyester compound. Polyester components which only comprise amorphous polyester compounds are preferred.

The amount of the epoxy component (ii) with respect to the total mass of components (i)–(iv) is between 20 wt. % to 70 wt. %. The epoxy component comprises at least one epoxy resin or epoxy monomer, preferably from 1–4 and more preferably from 1–3 epoxy resins and/or monomers. The epoxy compounds can be liquid or solid at room temperature under normal conditions. It was found that the softness of the pressure-sensitive adhesive at room temperature can be varied by varying the glass transition temperature of the polyester component (i) and the ratio of liquid and solid epoxy compounds. In case the polyester component comprises more than one polyester compound the glass transition temperature $T_g$ can be well estimated using the Fox equation $$1/T_g = \sum_n X_n(1/T_{g,n})$$

wherein $T_{g,n}$ is the glass transition temperature and $X_n$ is the mole fraction, respectively, of the n-th polyester compound. A full description of $T_g$ calculations based on the Fox equation can be found in Makromolekuele, 5th Ed. by Hans-Georg Elias (Huethig & Wepf, 1990), p. 856.

In case the glass transition temperature of the polyester component (i) is less than 0° C., the ratio $m_L/m_S$ of the sum of the masses of liquid epoxy compounds and liquid hydroxyl-functional compounds over the sum of the masses of solid epoxy compounds and solid hydroxyl-functional compounds preferably is not more than 1.2 and especially preferably lower than 0.50. In case the glass transition temperature of the polyester component is above 0° C., and, in particular, above 10° C., the ratio of the masses of liquid epoxy compounds and liquid hydroxyl-functional compounds over the masses of solid epoxy compounds and solid hydroxyl-functional compounds preferably is greater than 0.5, more preferably greater than 1 and most preferably greater than 2.

It was also found that the 90° peel adhesion of the pressure-sensitive adhesive on stainless steel can be modified and adapted to specific needs by varying the ratio $m_L/m_S$ for a given $T_g$ of the polyester component. The initial peel adhesion on stainless steel as measured 20 minutes after application of the pressure-sensitive adhesive tape can usually be increased in case the glass transition temperature of the polyester component is less than 0° C. by decreasing the above ratio $m_L/m_S$ as long as phase separation of the pressure-sensitive adhesive is avoided. In case the glass transition temperature of the polyester component is above 0° C., the initial peel adhesion can also generally be increased by decreasing the above ratio $m_L/m_S$ as long as $m_L/m_S>1$ whereas when decreasing the ratio $m_L/m_S$ in the area $m_L/m_S \leq 1$, an increase in peel adhesion is usually observed.

The amount of the optional hydroxyl-functional component (iii) with respect to the total mass of components (i)–(iv) is between 0–50 wt. % and preferably between 5–35 wt. %.

The hydroxyl-functional component if present, preferably comprises from 1–3 and more preferably 1 or 2 compounds. The hydroxyl-functional compounds can be solid or liquid at room temperature under normal conditions but they are preferably liquid. The amount of the hydroxyl-functional component is preferably chosen so that the combined mass of the epoxy component (ii) and the hydroxyl-functional component (iii) with respect to the total mass of components (i)–(v) is $$0.2 < \frac{\sum_{n=ii}^{iii} m_n}{\sum_{n=i}^{iv} m_n} < 0.7$$

wherein $m_n$ is the mass of the n-th compound and n is i, ii, iii and iv. This ratio more preferably is between 0.3 and 0.55.

It was also found that the ratio $m_{(ii)+(iii)}/m_{(i)}$ of the sum of the masses of liquid and solid epoxy compounds and liquid and solid hydroxyl functional compounds over the mass of the polyester compounds preferably is less than 1.7, more preferably less than than 1.6 and, in particular, less than 1.55. If the above ratio is more than 1.75 and, in particular, at least 1.8 the elasticity of the crosslinkable pressure-sensitive adhesive tape is insufficient and the holding power tends to be less than 5 minutes.

The glass transition temperature of the pressure-sensitive adhesive as measured by the peak in the 1 Hz tan delta curve when cooling the sample from a temperature about 50° C. above its $T_g$ to a temperature about 50° C. below its $T_g$ at a rate of 2° C./min using a Rheometrics RDA 11 in the parallel plate shear strain mode, is preferably between –15° C. and 30° C., more preferably between 0° C. and 25° C.

The $T_g$ of the pressure-sensitive adhesive can be modified by controlling $T_g$ of the polyester compound(s) and/or the above ratio $m_L/m_S$. Increasing the amount of polyester compound(s) with a lower value of $T_g$ tends to decrease the $T_g$ value of the pressure-sensitive adhesive. Increasing the ratio $m_L/m_S$ results in lowering the $T_g$ of the pressure-sensitive adhesive while decreasing the ratio $m_L/m_S$ tends to raise $T_g$ of the pressure-sensitive adhesive.

It is preferred that the pressure-sensitive adhesive does not exhibit macroscopic phase separation. By macroscopic phase separation it is meant that components of the pressure-sensitive adhesive tape migrate to the release liner protecting the exposed adhesive surfaces, and result in an easily visible haze on the release liner after it is removed from the pressure-sensitive adhesive tape.

The amount of the photoinitiator component (iv) with respect to the total mass of components (i)–(iv) is preferably between 0.01–5% by weight and more preferably between 0.1–2% by weight. The photoinitiator component preferably comprises 1–3 and, more preferably, 1 photoinitiator compound.

The mass percentages given for components (i)–(iv) of the pressure-sensitive adhesive add up to give 100 wt. %.

The pressure-sensitive adhesive may additionally comprise various fillers, adjuvants, additives and the like such as silica, glass, clay, talc, pigments, colorants, glass beads or bubbles, glass or ceramic fibers, antioxidants, flame retardants and the like so as to reduce the weight or cost of the composition, adjust viscosity, and provide additional reinforcement. Fillers and the like which are capable of absorbing the radiation used during the curing process should be used in an amount that does not adversely affect the curing process. The amount of such additives may be between 0–50 wt. % and more preferably 0–15 wt. % with respect to the total mass of components (i)–(iv).

The pressure-sensitive adhesive useful for the preparation of the pressure-sensitive adhesive tapes of the present invention exhibits a holding power value as measured according to the modified version of PSTC-14 described in the test section below, of at least 5 min., preferably of at least 10 min. and more preferably of at least 20 min. which allows for the preparation of pressure-sensitive adhesive tapes with improved room temperature handling properties. Unsupported pressure-sensitive adhesive tapes of the present invention with a thickness of, for example, 200 μm exhibit a certain elasticity and an elongation at break of typically 200% or more.

The pressure-sensitive adhesive used for the preparation of the pressure-sensitive adhesive tapes of the present invention exhibits a 90° peel adhesion at room temperature on stainless steel 20 minutes after application of at least 2N/0.5 inch, preferably at least 4 N/0.5 inch, more preferably of at least 6 N/0.5 inch and especially preferably of at least 7.5 N/0.5 inch. The peel adhesion can be modified and optimized with respect to a specific application by varying the glass transition temperature of the amorphous polyester component (i),
the ratio of liquid epoxy/solid epoxy compounds,
the amount of the optional hydroxyl functional component (iii), and/or
the ratio of liquid/solid hydroxyl functional compounds
the molecular weight of the components as was discussed above without adversely affecting the required mechanical integrity and room temperature handleability of the pressure-sensitive adhesive tape.

The pressure-sensitive adhesive tapes according to the present invention can be unsupported or supported.

Unsupported pressure-sensitive adhesive tapes comprising no backing (also termed as transfer tapes) can be obtained, for example, by mixing components (i)–(iii) and, if present, additional fillers, adjuvants or other additives in a suitable glass vessel at elevated temperatures sufficient to liquify the mixture. The mixture is then homogenized with a stirrer and the photoinitiator component (iv) is added. The resulting mixture is then coated with the desired thickness onto a first release liner such as a siliconized polyester film, and a second release liner is subsequently laminated onto the exposed surface of the unsupported pressure-sensitive adhesive tape. Adding the photoinitiator component (iv) shortly before coating avoids or minimizes degradation of the photoinitiator compounds and/or premature cationic polymerization. The method of preparation of unsupported pressure-sensitive adhesive tapes outlined above illustrates the invention only without limiting it. Other methods can be used such as, for example, extruding the unsupported adhesive tape onto a backing which may be, for example, a release liner.

Supported pressure-sensitive adhesive tapes comprise at least one backing. Depending on the respective application, the backing may be selected from a group of materials comprising polymeric films of various stiffness such as, for example, polyolefins, polyesters, polycarbonates or polymethacrylates, papers, non-wovens, one part mechanical fasteners (which are described, for example, in U.S. Pat. No. 5,077,870) or metals. The thickness of the backing typically varies between 25 μm and 3,000 μm, preferably between 25 and 1,000 μm. The backing material should be selected such that the layers of the adhesive bond very strongly to it. Such a choice can be made easily and does not require any inventive input from the expert. If desired, the backing may be treated with chemical primers or may be corona treated.

The pressure-sensitive adhesive can be applied to the backing by coating the molten mixture comprising components (i)–(iv) and, if present, additional fillers, adjuvants or other additives.

Because of its advantageous cohesive strength and holding power values, the pressure-sensitive adhesive used in the present invention allows for preparing unsupported pressure-sensitive adhesive tapes. The unsupported pressure-sensitive adhesive tapes can be used, for example, for assembling two substrates. The adhesive tape can be cut or die-cut to the desired geometrical shape and applied to the first substrate at room temperature using fingertip pressure or a suitable pressure-transferring device.

The curing reaction can be initiated, for example, by exposing the pressure-sensitive adhesive tape to actinic radiation (i.e., radiation having a spectrum in the UV or VIS spectral regions which at least partly overlaps the absorbence spectrum of the photoinitiator compounds) or electron beam radiation. Preferably, the energy is actinic radiation having a wavelength in the ultraviolet or visible spectral regions. Suitable sources of actinic radiation include mercury, xenon, carbon arc, tungsten filament lamps, sunlight, etc. Ultraviolet radiation, especially from a medium pressure mercury arc lamp, is especially preferred. Preferred radiation sources have an essential part of their spectral output in the wavelength range from 200–600 nm, more preferably from 250–450 nm and most preferably from 300–450 nm. Exposure times may be from less than about 1 second to 10 minutes or more (to provide a total energy exposure of typically between 25 and 2,000 mJ/cm$^2$ of UV-A energy measured by an appropriate photo detection device such as those obtained from EIT (Sterling, Va.) and calibrated according to N.I.S.T. (National Institute of Standards and Technology) standards depending on both the amount and the type of reactants involved, the energy source, the distance from the energy source, the thickness of the adhesive tape and the desired after-cure handling time.

The pressure-sensitive adhesive tapes may also be cured by exposure to electron beam (e-beam) radiation. The dosage necessary is generally from less than 1 megarad to 100 megarads or more. The rate of curing tends to increase with increasing amounts of initiator at a given energy exposure. The rate of curing also increases with increased energy intensity.

Subsequent to the initiation of the cationic curing reaction the second substrate is adhered to the pressure-sensitive adhesive tapes using pressure within the after-cure handling time. The after-cure handling time gives the time during which the respective substrate can be reliably adhered to the curing pressure-sensitive adhesive surface of the adhesive tape. With increasing crosslink density of the pressure-sensitive adhesive the wet-out properties of the adhesive tape with respect to the surface decrease and the desired mechanical properties of the assembly such as high values of overlap shear strength and/or impact strength may not be obtained any longer. The after-cure handling time depends on the properties of the pressure-sensitive adhesive used, the dose and geometry of irradiation, the thickness of the pressure-sensitive adhesive tape, the substrates and the desired properties of the assembly. The after-cure handling time may vary from one second up to 2 hours and is preferably between 2 and 15 minutes and more preferably between 2 and 5 minutes.

The unsupported pressure-sensitive adhesive tape may also be subjected to actinic and/or e-beam radiation prior to assembling it to the substrates thus initiating the cationic curing reaction prior to assembling. The actinic and/or e-beam radiation may be applied to one or both sides of the pressure-sensitive adhesive tape. Activating both sides of the pressure-sensitive adhesive tape results in more homogeneously cured pressure-sensitive adhesive tapes and is preferred. In case at least one of the substrates is transparent, for example, to UV radiation, curing can be initiated also after adhering the substrates to the pressure-sensitive adhesive tape by shining the UV light through the UV transparent substrate. If UV exposure is to only one side of the tape, it is preferred that the UV source has a substantial UV emission between 300 and 400 nm to best ensure uniform curing.

The pressure-sensitive adhesive tape according to the invention can be used for bonding a wide variety of substrates which may be selected from a group of materials consisting of glass, plastics, metals, ceramics and materials derived therefrom such as, for example, ceramic coated glass. Depending on the substrates chosen the mechanical properties of the cured assembly can sometimes be improved by heating one or both of the substrates and/or the pressure-sensitive adhesive tape after it has been applied to the substrate or substrates, respectively. The temperatures applied are preferably between 40 and 140° C., and more preferably between 80 to 120° C. Although the present inventors do not wish to be bound by such theory it is speculated that due to the elevated temperature the wetting-out properties of the pressure-sensitive adhesive tape at the interface substrate surface/adhesive tape surface are improved which results in an increased adhesion between substrate and tape. The heat applied to the tape or the substrate preferably is kept low enough so as to facilitate surface wet-out while avoiding that the entire pressure-sensitive adhesive tape melts and becomes liquid. Heat applied to the pressure-sensitive adhesive tape after it has been activated, increases the rate of the epoxy curing reaction.

The heat treatment may be applied to one of both, respectively, substrate/tape interfaces and it is also possible to keep the assembly at an elevated temperature during the curing reaction in order to decrease the curing time.

The assemblies according to the present invention are characterized by advantageous mechanical properties and, in particular, by high values of overlap shear strength and/or impact resistance as measured according to the test methods specified below. Assemblies of the present invention exhibiting an overlap shear strength of at least 4 MPa, more preferably of at least 6 MPa and, in particular, of at least 8 MPa are preferred. The impact resistance is preferably at least 3 kJ/m$^2$ and more preferably at least 6 kJ/m$^2$ and most preferably at least 9 kJ/m$^2$.

The pressure-sensitive adhesive tapes of the present invention are useful for various applications such as, for example, bonding applications in the automotive, construction or electronic industries.

In a specific application an unsupported pressure-sensitive adhesive tape of the present invention is used to adhere an attachment means to a windscreen which allows for easy adjusting of the windscreen when assembling it to the car body. The attachment means may comprise, for example, a stud, clip, strip or another fastener which is securely fastened or adhered to the windscreen by using an unsupported or supported pressure-sensitive adhesive tape of the present invention. The other end of the attachment means is placed into predetermined points of the car body. In a specific embodiment, the other end of the attachment means may pass through a hole in the car body where it is mechanically fastened, for example, by applying a nut to the attachment means or it may be held in place by gravity and friction. Specific geometries of the attachment means can be taken, for example, from U.S. Pat. No. 5,475,956. The attachment means may comprise various materials such as, for example, metals such as brass, bronze, aluminum or steel, and plastics such as PMMA (polymethylmethacrylate), polystyrene, polyamide, polycarbonate, polyester or other rigid and moderately polar plastics. In a particularly preferred embodiment, the attachment means is an injection molded pin having a base member approximately 2–3 cm in diameter, and a cylindrically shaped positioning member essentially 2–3 cm long and 0.5–1 cm in diameter, which is perpendicular to the base. The pin is preferably made from PMMA or polyamide. A UV-crosslinkable pressure-sensitive adhesive tape which preferably is unsupported, is unwound from a roll, preferably in form of die-cuts, and subjected to UV radiation. The first release liner is removed, and the activated pressure-sensitive adhesive tape is attached to the rear surface of the pin. After removal of the second release liner the pin is attached to a predetermined position on the windscreen, preferably to an area with a ceramic coating which has been pre-heated, for example, with IR-heaters, to a surface temperature of at least 60° C. and preferably at least 100° C. It was found that when subjecting the attachment means with the cured pressure-sensitive adhesive after the windscreen had been assembled to the car body, to a qualitative impact test (hitting with a hammer onto the windscreen), this resulted in breaking of the windscreen rather than any failure of the bond between windscreen and pin.

The pressure-sensitive adhesive tape may also be used for adhering oven brackets, for structural members or architectural configurations or for bonding integrated circuit chips in electronic industry.

The invention is further illustrated by the following, non-limiting examples. First, however, certain procedures and tests utilized in the examples, will be described.

Test Methods For the Uncuredpressure-Sensitive Adhesive Tapes

90° Peel Adhesion

90° C. peel adhesive was determined using PSTC-2, a procedure specified in "Test Methods for Pressure Sensitive Adhesive Tapes," 12th edition, available from the Pressure-Sensitive Adhesive Tape Council, 401 North Michigan Avenue, Chicago, Ill. 60611-4267, U.S.A.

A 1.27 cm×8 cm strip of an unsupported pressure-sensitive adhesive tape (200 μm thick) between two release layers was prepared as described in Example 1 and allowed to age for at least 24 h before testing. One release liner was removed and the exposed material pressed by hand onto the dull side of a 125 μm thick foil of anodized aluminum which serves as a backing for the tape construction. The anodized aluminum foil was 1.6 cm wide.

The second release liner was removed and the exposed surface adhered to a stainless steel test panel which had previously been cleaned with methyl ethyl ketone and heptane. The construction thus prepared was configured in such a manner that the anodized Al foil had an unbonded adhesive-free tab of about 10 cm for attachment to a tensile tester. The bonded construction was then passed over twice with a 6.8 kg roller and allowed to remain in contact with the test substrate for about 20 minutes before testing.

The test construction thus obtained was then placed in a tensile tester (Instron™) so that the aluminum foil was peeled away from the stainless steel test panel at an angle of 90 degrees. The peel adhesion was measured at a speed of 30.5 cm per min. and was recorded in N/1.27 cm.

The test was repeated 2 times and the results then averaged.

Holding Power

A modified version of PSTC-14 was applied, a procedure specified in "Test Methods for Pressure Sensitive Adhesive Tapes," 12th edition, available from the Pressure-Sensitive Adhesive Tape Council, 401 North Michigan Avenue, Chicago, Ill. 60611-4267, U.S.A.

An unsupported pressure-sensitive adhesive tape having a thickness of approximately 200 microns, sandwiched between two siliconized PET release liners, was cut in the form of a strip 1.27 cm wide and 8 cm long. One release liner was removed and the exposed adhesive face bonded to a strip of anodized aluminum sheeting which was 125 microns thick, 1.6 cm wide and about 10 cm long in such a manner that a 2 cm area on the end of the aluminum strip was not covered with adhesive.

The second release liner was removed and the entire exposed adhesive face adhered to a rigid aluminum plate which had been cleaned twice with heptane. The assembly thus formed was then passed over four times with a 2 kg roller.

After a dwell time of one minute, the assembly was suspended perpendicular to the gravitational force direction by attaching one end of the rigid aluminum plate to a vertical stand in such a way that the rigid aluminum substrate was uppermost and the flexible aluminum sheeting was suspended below it.

A 150 g weight was then attached to the exposed end of the aluminum sheeting which was not bonded to the aluminum plate. The time required for the adhesive bond to fail as measured by the falling of the weight was recorded in minutes.

Static Shear

This test is based on PSTC Method PSTC-7 (Procedure A), a procedure specified in "Test Methods for Pressure Sensitive Adhesive Tapes," 12th edition, available from the Pressure-Sensitive Adhesive Tape Council, 401 North Michigan Avenue, Chicago, Ill. 60611-4267, U.S.A. All measurements of this type were made at room temperature. An unsupported pressure-sensitive adhesive tape having a thickness of approximately 200 $\mu$m, sandwiched between two release liners was obtained as is described in Example 1. One release liner was removed and replaced by a 125 $\mu$m thick layer of anodized aluminum sheet. The second release liner was then removed, yielding an adhesive tape with an aluminum backing which was used in the static shear test. A 1.27 cm wide strip of tape prepared by the method just described was adhered to a flat, rigid, stainless steel plate with 2.54 cm length of tape in contact with the panel. The total bonded area was then 1.27 cm×2.54 cm. Then the panel with the adhered tape test sample was placed in a special stand tilted at two degrees from vertical for 10 minutes. Then a weight of 50 g was hung from the free end of the tape. The time required for the weight to fall is the Static Shear Value in hours.

Test Methods For the Cured Pressure-Sensitive Adhesive Tapes

Impact Resistance

A modified version of ISO 9653 was applied. Modification consisted of changes in the sample assembly configuration and bonded area. A custom stage was built so that metal test plates sides could be mechanically held in the stage area and smaller test bodies adhered to them.

The configuration of the bonded assembly used for making the test measurements comprised an aluminum test body having the dimension of 15 mm×20 mm×5 mm adhered to an aluminum test plate having the dimensions 2.54 cm×10 cm×2 mm. The test body was located in relationship to the test plate so that the 10 cm side of the test body was parallel to a line defining the minimum point of the pendulum swing. The bonded area was 1.27 cm×2 cm. Both the aluminum test plate and the aluminum test body were cleaned by light abrasion with a Scotchbrite™ scouring pad with water and then washing with MEK, then isopropanol, followed by a final rinse with MEK. The aluminum pieces were then allowed to air dry before the test assembly was prepared.

A 250 micron thick unsupported pressure-sensitive adhesive tape which was prepared as described in Example 1 and allowed to age for at least 24 hours before testing. A sample having the dimension of 1.27 cm×2.0 cm was cut.

One liner was removed and the exposed pressure-sensitive adhesive irradiated with 200 mJ/cm$^2$ from a ultraviolet light bulb (H-bulb available from Fusion Systems Corporation, Rockville, Md., USA) contained in a high intensity ultraviolet light source, also commercially available from Fusion Systems Corporation. The amount of energy used to irradiate the adhesive face was measured using a UVI MAP (TM) UV and Temperature Measuring/Plotting System, Model UM365H-S (Electronic Instrumentation Technology Inc., Starling, Va., USA) designed to measure UV-A radiation in the range of 320–390 nm. The device was calibrated according to N.I.S.T. standards (National Insitute of Standards and Technology). The irradiated pressure-sensitive adhesive was then adhered to the aluminum test body in such a manner that the 1.27 cm width of the adhesive strip was centered and parallel to the 20 mm edge of the test body.

The second liner was then removed from the adhesive and irradiated in the same fashion as above. The exposed adhesive was then adhered to test plate, thus bonding the test body and the test plate together.

The bonded assembly was then clamped together with pliers using moderate hand pressure for about one second. The bonded sample assembly was allowed to cure at 23° C. at 50% relative humidity for three days before testing.

A commercially available impact tester, available as Model 5102 from Zwick GmbH, Ulm, Germany, was employed. A 4 Joule pendulum, corresponding to a weight of 934.6 g was employed at a speed of 2.93 m/s. This speed was generated by raising the pendulum to the full extension of 160° on an arm length of 225 mm before the weight was released and allowed to strike the sample assembly in a shearing mode described in ISO 9653 and designed to shear the test body off of the test plate.

The amount of energy absorbed by the sample assembly as the pendulum broke the adhesive bond was measured by reading the height of the pendulum swing and recorded in Joules. The test was conducted on each of three separate assemblies and the results averaged.

Overlap Shear

A modified version of ISO 4587 was employed.

Aluminum coupons (100 mm×25 mm×2 mm) were subjected to light abrasion treatment with a Scotchbrite™ scrubbing pad (available from 3M Company) followed by soap/water and finally cleaned with isopropanol.

The assemblies were prepared by removing one of the two protective liners from a pressure-sensitive adhesive strip (1.27 cm×2.54 cm ) as generated in the examples, irradiating the exposed adhesive surface in the manner described in the test section for Impact Resistance above except that the pressure-sensitive adhesive tape was irradiated with 400 mJ/cm$^2$ from both sides, and then bonding the irradiated adhesive to the aluminum coupon. The second protective liner was removed and the second surface of the adhesive irradiated as well in the same manner. Finally the second surface of the adhesive tape was bonded to the second aluminum coupon in a configuration described in the standard method. The adhesive was aligned with the longer side perpendicular to the direction of the applied force during the test and it was always placed so that it was flush with the end of the bonded coupon.

The bonded assemblies were clamped together with a pliers using moderate hand pressure for approximately 1 second and allowed to cure at 23° C. and 50% relative humidity for at least three days before testing.

Dynamic overlap shear test were performed on assemblies comprising the sequence A1 coupon/adhesive/A1 coupon prepared as described above. The test method deviated from the standard test method specified above in that the crosshead speed was 5 mm/min. The test was repeated three times for each sample and the average value was recorded in Mpa.

Materials Used in the Examples

Polyester Compounds

DYNAPOL S 1313, amorphous copolyester, $T_g$=13° C., softening point $T_s$=100° C., commercially available from Hüls AG, Marl, Germany.

DYNAPOL S 1421, amorphous copolyester, $T_g$=-4° C., $T_s$=80° C., commercially available from Hüls AG, Marl, Germany DYNAPOL S 1402, slightly crystalline copolyester, $T_g$=-12° C., melting point $T_m$==92° C., commercially available from Hüls AG, Marl, Germany DYNAPOL S 1359, slightly crystalline copolyester, $T_g$=-16° C., $T_g$=100° C., commercially available from Hüls AG, Marl, Germany DYNAPOL S 1227, moderately crystalline copolyester, $T_g$=13° C., $T_m$=118° C., commercially available from Hüls AG, Marl, Germany DYNAPOL S 1228, moderately crystalline polyester, $T_g$=-3° C., $T_m$=110° C., commercially available from Hüls AG, Marl, Germany Epoxy Resins DER 331, epoxy equivalent weight ca. 187, liquid at room temperature and atmospheric pressure, commercially available from Dow Chemical Comp., Midland, Mich.

EPON 1001, epoxy equivalent weight ca. 515, solid at room temperature and atmospheric pressure, commercially available from Shell Chemical Hydroxyl Functional Compounds VORANOL 230–238, polyol adduct of glycol and propylene oxide having a hydroxyl number of 38, molecular weight (number average) of 700, liquid at room temperature and atmospheric pressure, commercially available from Dow Chemical, Midland, Mich. (termed in the tables below as V 230–238)

SIMULSOL BPHE, a difunctional bisphenol A based polyol, liquid at room temperature and atmospheric pressure, molecular weight (number average) of 315, commercially available from Seppic, Paris, France (termed below as BPHE)

SIMULSOL BPRE, a difunctional bisphenol A based polyol, liquid at room temperature and atmospheric pressure, molecular weight (number average) of 755, commercially available from Seppic, Paris, France (termed below as BPRE)

TONE 0305, a trifunctional polycaprolactam based polyol, liquid at room temperature and atmospheric pressure, molecular weight (number average) of 540, commercially available from Union Carbide (termed below as T 0305)

TERETHANE 1000, a difunctional poly THF based polyol, liquid at room temperature and atmospheric pressure, molecular weight (number average) of 1000, commercially available from DuPont (termed below as T 1000)

Cationic Photoinitiator

UVOX UVI 6974, triarylsulfonium complex salt, commercially available from Union Carbide, Danbury, Conn.

EXAMPLES

Examples 1–12

The polyester component (i), the epoxy component (ii) and the hydroxyl-functional component (iii) as specified in Table 1 were combined in a closed glass container and placed in a forced air oven for 2 hours at 150° C. The resulting mixture was stirred until a homogeneous mixture was obtained. The photoinitiator component (iv) as specified in Table 1 was then added and the mixture was again stirred until the photoinitiator was dissolved.

The resulting liquid mixture was then poured between two siliconized PET release liners previously threaded onto a heated hot knife coater. The hot knife coater had a bed temperature of 100° C. and the knife was pre-heated in an oven to 120° C. before coating. Hot-knife coating resulted in an unsupported pressure-sensitive adhesive tape with a thickness of about 200 μm between the PET release liners.

The unsupported pressure-sensitive adhesive tapes were tested according to the test methods specified above, and the results obtained are summarized in Table 2.

Comparative Example 1

An unsupported pressure-sensitive adhesive film having the composition specified in Table 1, was prepared according to the method of Example 1. Although comprising the amorphous polyester DYNAPOL S 1421, the unsupported pressure-sensitive adhesive film exhibits a holding power of virtually 0 min. (see Table 2) which is due to the high ratio of liquid/solid epoxy resins of about 1.93.

Comparative Example 2

An unsupported pressure-sensitive adhesive film having the composition specified in Table 1, was prepared according to the method of Example 1. Although comprising the amorphous polyester DYNAPOL S 1313, the unsupported pressure-sensitive adhesive film exhibits a holding power of less than 5 minutes (see Table 2) because the ratio $m_{(ii)+(iii)}/m_{(i)}$ is 1.75 which is too high to give the required elasticity of the pressure-sensitive adhesive tape.

Comparative Example 3

An unsupported pressure-sensitive adhesive film having the composition specified in Table 1, was prepared according to the method of Example 1. Although comprising the amorphous polyester DYNAPOL S 1313, the unsupported pressure-sensitive adhesive film exhibits a holding power of virtually 0 min. (see Table 2) which results from the low ratio $m_L/m_{S\ of}$ 0.

Comparative Examples 4–18

Unsupported pressure-sensitive adhesive films having the composition specified in Table 1, were prepared according to the method of Example 1. The films were tested according to the test methods specified above, and the results obtained are summarized in Table 2. The adhesive films of Comparative Examples 2–16 which comprise slightly crystalline and moderately crystalline polymers, exhibit insufficient values of the holding power.

TABLE 1

| Ex. | Polyester component DYNAPOL #, amount (wt. %) | Epoxy component DER 331 (wt. %) | Epoxy component EPON 1001 (wt. %) | Hydroxyl-functional component Compound, amount (wt. %) | Photoinitiator component UVOX UVI 6974 |
|---|---|---|---|---|---|
| 1 | S 1313, 40 | 20 | 24 | V230-238, 15 | 1 |
| 2 | S 1313, 40 | 25 | 19 | V230-238, 15 | 1 |
| 3 | S 1421, 40 | 15 | 29 | V230-238, 15 | 1 |
| 4 | S 1421, 40 | 0 | 44 | V230-238, 15 | 1 |
| 5 | S 1313, 42.1 | 15.8 | 30.5 | V230-238, 10.5 | 1 |
| 6 | S 1313, 42.8 | 12.0 | 29.1 | V230-238, 15.1 | 1 |
| 7 | S 1313, 71.4 | 26.8 | 0 | 0 | 1.8 |
| 8 | S 1313, 40 | 15 | 29 | BPHE, 15 | 1 |
| 9 | S 1313, 40 | 15 | 29 | BPRE, 15 | 1 |
| 10 | S 1313, 40 | 15 | 29 | T0305, 15 | 1 |
| 11 | S 1313, 40 | 15 | 29 | T1000, 15 | 1 |
| C1 | S 1421, 40 | 29 | 15 | V230-238, 15 | 1 |
| C2 | S-1313, 36 | 16.9 | 32.6 | V230-238, 13.5 | 1 |
| C3 | S-1313, 57.1 | 0 | 41.4 | 0 | 1.5 |
| C4 | S 1402, 40 | 29 | 15 | V230-238, 15 | 1 |
| C5 | S 1402, 40 | 15 | 29 | V230-238, 15 | 1 |
| C6 | S 1402, 40 | 0 | 44 | V230-238, 15 | 1 |
| C7 | S 1359, 40 | 44 | 0 | V230-238, 15 | 1 |
| C8 | S 1359, 40 | 29 | 15 | V230-238, 15 | 1 |
| C9 | S 1359, 40 | 15 | 29 | V230-238, 15 | 1 |
| C10 | S 1359, 40 | 0 | 44 | V230-238, 15 | 1 |
| C11 | S 1227, 40 | 44 | 0 | V230-238, 15 | 1 |
| C12 | S 1227, 40 | 29 | 15 | V230-238, 15 | 1 |
| C13 | S 1227, 40 | 15 | 29 | V230-238, 15 | 1 |
| C14 | S 1227, 40 | 0 | 44 | V230-238, 15 | 1 |
| C15 | S 1229, 40 | 44 | 0 | V230-238, 15 | 1 |
| C16 | S 1229, 40 | 29 | 15 | V230-238, 15 | 1 |
| C17 | S 1229, 40 | 15 | 29 | V230-238, 15 | 1 |
| C18 | S 1229, 40 | 0 | 44 | V230-238, 15 | 1 |

TABLE 2

| Ex. | Holding power (min.) | Static shear (hr) | 90° Peel adhesion (N/1.27 cm) | Impact resistance (kJ/m$^2$) | Overlap shear (MPa) |
|---|---|---|---|---|---|
| 1 | 21.1 | >8 | 8.7 | 9.4 | 14.0 |
| 2 | 22.0 | 6.2 | 4.0 | 9.7 | 13.5 |
| 3 | 28.1 | 1.1 | 13.7 | 14.7 | 11.6 |
| 4 | <30 | 8.9 | 29.6 | 9.8 | 9.0 |
| 5 | >10 | N/T | 17.8 | 2.2 | 13.2 |
| 6 | >10 | N/T | 8.7 | N/T | 7.1 |
| 7 | >50 | N/T | 9.2 | N/T | 4.0 |
| 8 | >10 | N/T | 33.8 | 0.7 | N/T |
| 9 | >50 | N/T | 15.1 | 6.1 | 4.7 |
| 10 | >10 | N/T | 18.7 | 3.8 | 6.6 |
| 11 | >50 | N/T | 2.8 | 3.2 | 7.4 |
| C1 | N/A | 0 | 2.0 | 14.0 | 13.2 |
| C2 | <5 | N/T | N/T | N/T | N/T |
| C3 | N/A | N/T | 0 | 0 | 0 |
| C4 | N/A | 1.9 | 1.4 | N/A | N/A |
| C5 | 1.1 | 20.9 | 2.2 | 11.0 | 12.2 |
| C6 | 2.2 | >70 | 20.2 | 5.8 | 10.1 |
| C7 | N/A | 0.2 | N/A | N/A | N/A |
| C8 | N/A | N/A | N/A | N/A | N/A |
| C9 | 0.2 | N/A | 1.5 | 11.0 | 13.0 |
| C10 | 0.7 | 0 | 18.4 | 7.5 | 11.2 |
| C11 | N/A | N/A | N/A | N/A | N/A |
| C12 | N/A | N/A | <0.5 | 0.5 | <1 |
| C13 | N/A | N/A | 0.89 | 0.9 | 2.9 |
| C14 | N/A | N/A | 13.96 | 13.9 | <1 |
| C15 | N/A | N/A | N/A | N/A | N/A |
| C16 | N/A | N/A | 0.75 | 0.8 | 13.3 |
| C17 | N/A | N/A | 2.16 | 2.2 | <1 |
| C18 | N/A | N/A | 4.95 | 5.0 | 2.8 |

N/A: Not applicable. The test could not be conducted because the materials had too little cohesive strength to be handled, holding power virtually 0 min, and/or no proper sample could be obtained for the respective test.
N/T: Not tested.

What is claimed is:

1. Pressure-sensitive adhesive tape with improved room temperature handleability comprising at least one pressure-sensitive adhesive layer with at least one exposed surface and optionally a backing, wherein the pressure-sensitive adhesive layer comprises an epoxy/polyester based pressure sensitive adhesive comprising (i) 30–80% by weight of a polyester component comprising one or more amorphous polyester compounds;

(ii) 20–70% by weight of an epoxy component comprising one or more epoxy resins and/or monomers;

(iii) 0–5% by weight of a hydroxyl-functional component comprising one or more hydroxyl-containing compounds having a hydroxyl functionality of at least 1; and (iv) an effective amount of a photoinitiator component for crosslinking the pressure-sensitive adhesive;
wherein the weight percentages refer to the total mass of components (i)–(iv) and add up to 100% by weight and the pressure-sensitive adhesive exhibits a holding power of at least 5 minutes and is crosslinkable, upon exposure to actinic or electron beam irradiation, and optionally heat.

2. Pressure-sensitive adhesive tape according to claim 1 wherein the amorphous polyester compounds exhibit a glass transition temperature of between −20 and 50° C.

3. Pressure-sensitive adhesive tape according to claim 1 wherein the ratio of the sum of the masses of compounds of components (i)–(iii) which are liquid at room temperature with respect to the total mass of components (i)–(iii) is not more than 0.6.

4. Pressure-sensitive adhesive tape according to claim 1 wherein the ratio of the sum of the masses of components (ii)

and (iii) with respect to the total mass of components (i)–(iv) is between 0.2 and 0.7.

5. Pressure sensitive adhesive tape according to claim 1 which exhibits a 90° peel adhesion value at room temperature on stainless 20 minutes after application of at least 4 N/0.5 inch.

6. Pressure-sensitive adhesive tape according to claim 1 comprising a photoinitiator component consisting of one or more photoinitiators for cationic crosslinking.

7. Pressure-sensitive adhesive tape according to claim 6 wherein the photoinitiator component comprises one or more photoinitiators selected from the group consisting of aromatic onium complex salts and metallocene salts.

8. Pressure-sensitive adhesive tape according to claim 1 wherein the hydroxyl-functional component comprises one or more compounds selected from the group consisting of bisphenal-A extended polyols, polyol adducts of glycol and propylene oxides, polycaprolactam based polyols and polytetrahydrofuran based polyols.

* * * * *

UNITED STATES PATENT AND TRADEMARK OFFICE
CERTIFICATE OF CORRECTION

PATENT NO. : 6,254,954 B1
DATED : July 3, 2001
INVENTOR(S) : Greggory S. Bennett, Clayton A. George, Guido Hitschmann and Alain H. Lamon It is certified that error appears in the above-identified patent and that said Letters Patent is hereby corrected as shown below:

Column 5,
Lines 57 and 58, "Araldite™ 720" should read -- Araldite™ MY 720 --;

Column 6,
Line 24, "formula (I)" should read -- formula (I): --;
Line 62, "$\Theta^6$" should read -- $\eta^6$ --;
Line 62, "hexaflurorphos-" should read -- hexafluorophos- --;

Column 8,
Line 64, "S-011" should read -- S-1011 --;

Column 9,
Line 7, "PHE," should read -- BPHE, --;
Line 29, "equation" should read -- equation: --;

Column 18,
Line 57, "$_{of}$" should read -- of --.

Signed and Sealed this

Eleventh Day of June, 2002

*Attest:*

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO. : 6,254,954 B1  Page 1 of 1
DATED : July 3, 2001
INVENTOR(S) : Bennett, Greggory S.

It is certified that error appears in the above-identified patent and that said Letters Patent is hereby corrected as shown below:

<u>Column 20,</u>
Line 46, "0.5%" should read -- 0-50% --.

Signed and Sealed this

Twenty-fifth Day of March, 2003

JAMES E. ROGAN
*Director of the United States Patent and Trademark Office*